Figure 1:
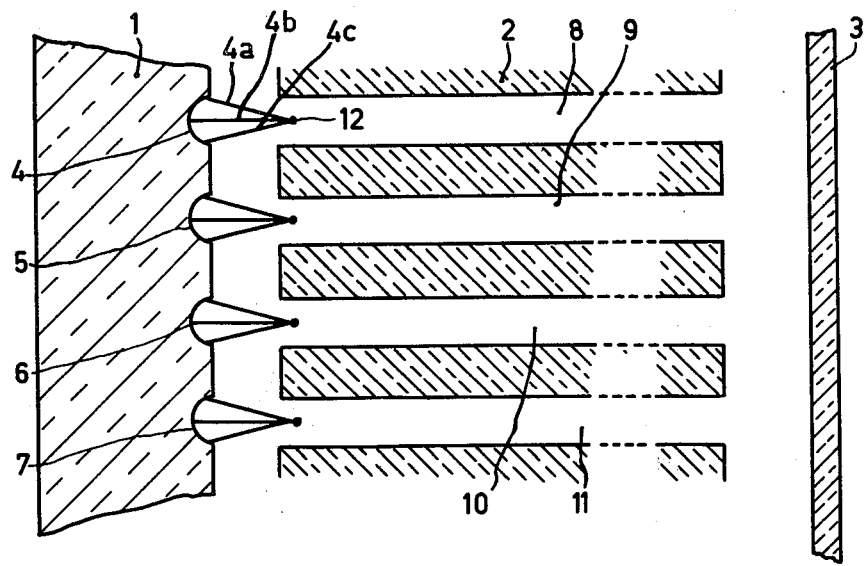

United States Patent [19]
Eschard et al.

[11] 3,987,522
[45] Oct. 26, 1976

[54] METHOD OF MANUFACTURING AN IMAGE DISPLAY DEVICE INCORPORATING PROXIMITY FOCUSSING

[75] Inventors: Gilbert Eschard; Valere Dominique Louis Duchenois, both of Paris, France

[73] Assignee: U.S. Philips Corporation, New York, N.Y.

[22] Filed: Oct. 17, 1974

[21] Appl. No.: 515,453

[30] Foreign Application Priority Data
Oct. 17, 1973 France .................... 73.37039

[52] U.S. Cl. .................... 29/25.18; 29/25.17
[51] Int. Cl.² .................... H01J 9/20
[58] Field of Search ............ 29/25.1, 25.11, 25.17, 29/25.18; 250/492 R, 492 B; 313/495, 105 R, 105 CM, 95, 103, 104; 156/2, 3; 204/164, 155, 156; 96/36, 36.1, 38.4

[56] References Cited
UNITED STATES PATENTS
2,989,385  6/1961  Gianola .................... 156/2 X
3,614,820  10/1971  Morris .................... 29/25.11

FOREIGN PATENTS OR APPLICATIONS
1,579,065  8/1969  France

OTHER PUBLICATIONS
B395,478, Jan. 1975, Orthuber, 313/495.

Primary Examiner—Richard B. Lazarus
Attorney, Agent, or Firm—Frank R. Trifari; Ronald L. Drumheller

[57] ABSTRACT

Method of manufacturing image display apparatus having a photocathode which is proximity focussed with respect to a micro-channel plate, comprising the steps of: positioning a photocathode substrate adjacent to the input face of a microchannel plate, the substrate having a surface facing the microchannel plate which may be altered by ion radiation bombardment; directing ion radiation from the channels of the microchannel plate by imposing a suitable voltage potential across the microchannel plate in a vacuum atmosphere to alter the surface of the substrate in a pattern of individual areas corresponding to the channels of the microchannel plate; forming a bowl-shaped photo-emissive recess at each of the altered individual areas; and spacing the substrate from the microchannel plate by a distance which results in each bowl-shaped photo-emissive recess being proximity focussed on the input aperture of the same channel that defined the individual area at which the bowl-shaped photo-emissive recess was formed.

2 Claims, 4 Drawing Figures

METHOD OF MANUFACTURING AN IMAGE DISPLAY DEVICE INCORPORATING PROXIMITY FOCUSSING

The invention relates to electronic image display tubes, notably to an improvement of the proximity focussing in said tubes, and to a method of realizing the said improvement.

Tubes of this kind inter alia comprise a photocathode which, under the influence of a light beam, emits electrons which land on a screen arranged parallel to the photocathode, the said electrons being possibly multiplied in advance in a secondary-emissive microchannel plate which is arranged between the photocathode and the screen.

It is known that in a photocathode a large number of electrons emitted by an element having a photosensitive surface have a transverse velocity component which determines a path which is not perpendicular to the surface. The paths of the said electrons are then parabolic and cause a spot on the screen or the entrance of the microchannel plate which is larger than the photosensitive surface element itself. The said spot is larger as the distance between the photocathode and the screen or the entrance of the microchannel plate is larger, thus giving rise to a proportional decrease of the resolution of the tube.

In proximity focussing the resolution is in fact directly proportional to the square root of the acceleration voltage and inversely proportional to the distance between the electrodes. In the case of high resolution, the possibilities are limited by the voltage behaviour of the electrodes, the electrical breakdown voltages between the electrodes, the field emission and the technological problems encountered in realizing very short distances between the electrodes.

French Pat. No. 1,579,065 proposes a solution to eliminate the said restrictions in a tube which comprises a photocathode and a luminescent screen. The photocathode of the said tube comprises a number of adjacently provided recesses which are approximately bowl-shaped and which have a small diameter. The screen is situated at a suitable distance from the photocathode to ensure that the electronic image of each bottom face of the said recesses is formed on the screen under the influence of the electrical voltage applied between the photocathode and the screen. As a result, the distance between the photocathode and the screen may then be comparatively large, whilst high electrical voltages between the electrodes are also permissible.

The invention concerns the same problem, but relates more specifically to image display tubes also comprising a microchannel plate between the photocathode and the screen.

According to the invention, the photocathode is also provided on its surface with a number of bowl-shaped recesses whereby the electronic emission is concentrated in a series of points which are situated on the entrance surface of the microchannel plate; however, these points are distributed taken into account the distribution of the microchannels in the plate material. In order to enhance the effect of the device, notably as regards its resolution and sensitivity, a two-fold corresondence is realized between the emissive elements of the photocathode on the one side and the microchannels of the plate on the other side. The number of emissive elements corresponds to the number of microchannels, and each element is situated opposite the entrance of a microchannel, the electronic emission of each element then being concentrated on the entrance of the microchannel situated opposite this element.

The distance between the photocathode and the microchannel plate is thus increased in the same manner as described in French Pat. No. 1,579,065 for the distance between the photocathode and the screen. The alignment of the bowl-shaped recess and the microchannel relates to distances which are still very small, i.e. in the order of a few tens of microns. On the other hand, a given irregularity in the positioning of the microchannels in the channel plate is to be taken into account. This hampers the realization of the bowl-shaped recesses and the alignment of the recesses and the channels.

It is one of the objects of the invention to realize this alignment with precision. The invention relates to image display tubes comprising photocathodes of the type divided into cells and also comprising microchannel plates of a geometrically corresponding shape as already described. It is another object of the invention to provide an industrial method of constructing such image display devices and realizing the said geometrical correspondence.

According to the invention an electronic image display device is obtained which comprises in the following order inter alia a photocathode, a secondary-emissive microchannel plate, and a luminescent screen, characterized in that the emissive surface of the photocathode comprises a number of adjacently arranged bowl-shaped recesses of small dimensions, the concave side of the said recesses facing the microchannel plate, such a geometrical correspondence existing between the said bowl-shaped recesses and the channels that each bowl-shaped recess is situated opposite one microchannel at a distance such that the electronic image of the bottom surface of the said recess is formed on the entrance of the said microchannel under the influence of the voltage applied between the photocathode and the entrance surface of the microchannel plate.

The invention also provides a method of realizing a cathode having the said recesses and of connecting such a photocathode to the microchannel plate in a manner such that the alignment of the recesses and the microchannels according to the invention is realized. Some embodiments of the device will be described hereinafter with reference to the accompanying drawing.

Figure 2:
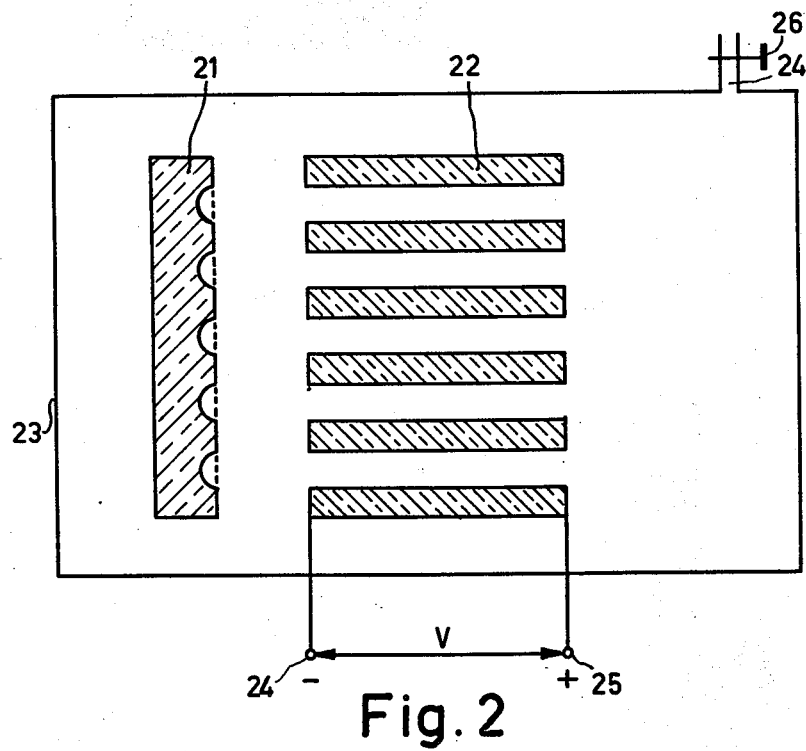
Figure 3:
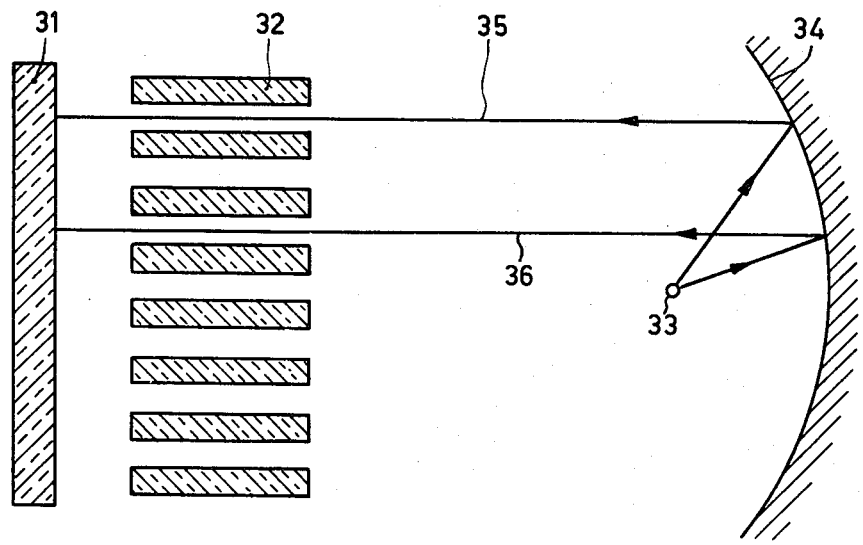
Figure 4:
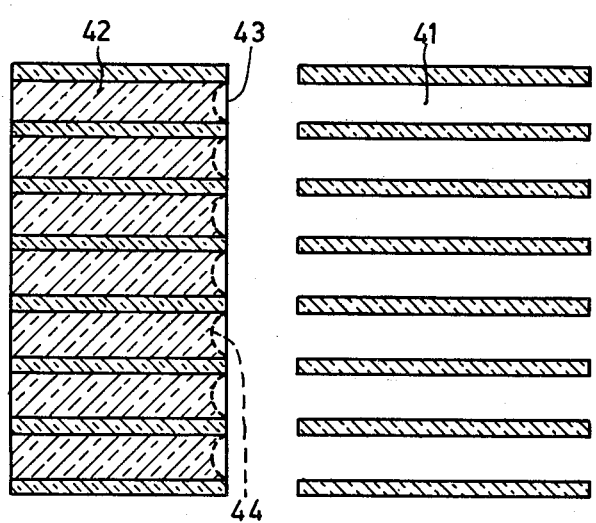

FIG. 1 is a diagrammatic cross-sectional view of a part of the image display device according to the invention, FIG. 2 illustrates a first method according to the invention, FIG. 3 illustrates a second and a third method according to the invention, and FIG. 4 illustrates a fourth method according to the invention. FIG. 1 diagrammatically shows (at an increased scale) a part of a photocathode 1, of a secondary-emissive microchannel plate 2, and of a luminescent screen 3.

The photocathode 1 comprises a number of bowl-shaped recesses 4, 5, 6 and 7, the concave side of which faces the microchannel plate and which are situated opposite the microchannels 8, 9, 10 and 11 in the said order.

Under the influence of suitable potentials (known, but not shown in the Figure) applied to the photocathode, the entrance and exit surfaces of the microchannel plate and the screen, the paths of the electrons emitted by each of the recesses of the photocathode are substantially converged in one point 12 on the entrance of the corresponding microchannel. The paths are denoted in FIG. 1 by 4a, 4b, 4c. As a result, each microchannel receives and multiplies only the electrons provided by the photocathode surface element situated opposite the relevant channel; it will be obvious that for otherwise the same circumstances the resolution of the system is thus improved.

FIGS. 2, 3 and 4 diagrammatically illustrate three methods according to the invention for realizing the bowl-shaped recess and the alignment between the microchannels and the said recesses.

The principle of the invention consists in the acquisition of assistance from the microchannel plate during the provision of the bowl-shaped recesses. The said plate and the photocathode substrate are arranged opposite and very near to each other. The microchannels have a guiding function during the action of the etchant on the photocathode substrate to form the said bowl-shaped recesses.

According to a first method as illustrated in FIG. 2, use is made of a flat transparent glass plate 21 which serves as the photocells substrate and which is arranged opposite and in the immediate vicinity of the microchannel plate 22, the arrangement being in accordance with the positioning in an image display tube to be composed of the photocathode and the said plate 22 to be manufactured. The glass plate 21 and the plate 22 are maintained in the correct position by means not shown. In order to enable the glass plate to be positioned in the same way each time with respect to the microchannel plate during the various phases of the method, both plates are provided with a number of marks which are used in cooperation with other mechanical means.

The assembly formed by the glass plate and the microchannel plate is arranged in an evacuated space 23. This space includes a valve 26 which enables the necessary vacuum to be realized in the said space, or the introduction of a suitable atmosphere at a given underpressure. So as to form the "cells" on the surface of the substrate 21, the tube is evacuated and subsequently filled, for example, with argon. Under the influence of the electrical potential which is applied, via the terminals 24 and 25, between the surfaces of the microchannel plate and which amounts to a plurality of Kilovolts, ions are formed in the microchannels which are accelerated in the direction of the glass plate 21 and which land thereon. This results in the scattering of the glass on the surface of the glass plate 21 opposite each microchannel, and also in the formation of the said bowl-shaped recesses. When the said scattering has been sufficient to obtain the desired depth of the recesses, the substrate is separated from the microchannel plate. Via a known treatment, the plate is given its photoemissive properties on the surface provided with the recesses by scattering. After termination of this treatment, the glass plate is again positioned opposite the microchannel plate. After the formation of the cathode, to be performed in vacuum, this vacuum should not be lost when the photocathode is provided in the tube. It will be obvious that in the method according to the invention known devices are used for performing the described operations and that these devices do not form part of the invention. Some of these devices are described, for example, in U.S. Pat. Nos. 3,243,627 and 3,026,163. These devices enable the performance in one and the same vacuum arrangement of the same operations for the various elements of one and the same electron tube and to assemble the said elements without the vacuum being lost between the successive operations.

In the present case such an arrangement is, moreover, provided with means which enable during the assembly of the elements of the electron tube the photocathode to be arranged with respect to the microchannel plate such that each recess or cell is aligned with the corresponding channel of the microchannel plate, it also being possible to perform the necessary tests with a precision of, for example, a few microns.

For example, the microchannel plate can be mounted in the correct position in the electron tube while the glass plate which serves as the substrate and which forms the entrance window of the said tube is first positioned with respect to the microchannel plate on one of the extremities of the tube with the aid of a mechanical device with marks and abutment cams on the glass plate and on the tube body. After the formation of the bowl-shaped recesses in the glass, the glass plate can thus be refitted, after its removal for imparting the proper photo-electrical sensitivity to the said recesses, in the correct manner in the original position with respect to the microchannel plate.

Another method of positioning the photocathode substrate (glass plate) with respect to the microchannel plate consists in the fixing of the said substrate on one of the extremities of the tube body, the said extremity being deformable, whilst subsequently the glass plate can be linearly displaced in its own plane with respect to the microchannel plate; the positioning of the plate is achieved by displacements of micrometer screws and a simultaneously performed test by means of a microscope, the necessary "rigidity" being imparted to the said deformable extremity after adjustment.

Another solution is to seal the tube by providing a liquid seal, for example containing gallium, between the tube body and the photocathode glass. A suitable linear movement can then be imparted to the glass in the tube portion without the sealing quality of the space being reduced; this operation can also be performed in the ambient atmosphere. After the adjustment by means of a microscope, the glass is mechanically blocked in the tube body by means of a setting resin or cement.

In accordance with a second method according to the invention as illustrated in FIG. 3, the photocathode substrate is formed by a transparent glass which is light-sensitive in a given spectrum band. A glass of this kind is, for example, the commercially available type "Fotoform". This glass is sensitive to ultraviolet radiation. Similar to FIG. 2, a plate 31 of Fotoform glass is arranged opposite a microchannel plate 32, the position thus obtained being locked as in the first embodiment of the method. The microchannels then serve to direct the ultraviolet light onto the Fotoform glass. To this end, a source 33 of ultraviolet light is arranged at one of the focal points of a concave mirror 34 which returns the rays in a direction parallel to the axis of the microchannels, for example, the rays 35 and 36 in the Figure.

The light which passes through the microchannels and is thus guided thereby influences the Fotoform glass situated opposite the ends of the microchannels, thus producing an exact image of the microchannel structure of the plate 32.

By photographic development of the substrate surface exposed to the light radiation, the glass can be partly dissolved at the areas exposed to radiation in order to obtain the bowl-shaped recesses or cells. The glass surface thus formed is made photo-emissive as in the previous example. The glass plate is subsequently positioned again with respect to the microchannel plate in the described manner and under the same physical circumstances.

According to a third method, derived from the second method, the photocathode substrate is not formed by Fotoform glass but by a normal glass on which a resin or a photosensitive lacquer is provided. A source transmitting normal light is then used. After development of the layer, the resin or lacquer has disappeared at the areas opposite the microchannels exposed to the radiation. The glass is subsequently suitably dissolved at these areas.

According to a fourth method, the photocathode substrate is formed by a flat thin glass slive which is cut from the same fibre bundle as the microchannel plate. The microchannels of the fibre bundle initially contain a quantity of core glass. This glass has suitable dissolving properties as well the suitable diffraction index which is adapted to the index of the electrically conductive glass forming the jacket of the microchannels for proper transmission of the light guided through the channels. Two successive slices are cut from such a bundle. These slices are provided with the necessary marks in order to enable alignment. A slice 41 of FIG. 4 is treated and punctured in the conventional manner in order to obtain a tube channel plate for electron multiplication. The other slice 42, one of the faces of which is a faithfull copy of one of the faces of the slice 41, is formed by optical fibres. One of the faces 43 of the said slice 42 is polished, after which only the core glass of each microchannel is slightly attacked in a chemical manner in order to obtain the recesses or cells such as the recess or cell 44 on the end of each channel. The surface thus treated is made sensitive in order to impart the desired photoemissive properties thereto.

The slice 42 is subsequently fitted again in front of the plate 41 exactly (using the marks provided on the slices 41 and 42) in order to align the fibre thus hollowed out with the corresponding punctured microchannel of the microchannel plate; the substrate is made sensitive and the elements of the tube are assembled in the same manner and under the same circumstances as already described.

The slice 42 in the display tube then performs the function of an optical fibre bundle wherethrough the light emitted by the image to be displayed is guided to the photocathode comprising the recesses 44.

We claim:
1. Method of manufacturing image display apparatus having a photocathode which is proximity focused with respect to a micro-channel plate, comprising the steps of:

positioning a photocathode substrate adjacent to the input face of a microchannel plate, the substrate having a surface facing the microchannel plate which may be altered by ion radiation bombardment;

directing ion radiation from the channels of the microchannel plate by imposing a suitable voltage potential across the microchannel plate in a suitable vacuum atmosphere to alter the surface of the substrate in a pattern of individual areas corresponding to the channels of the microchannel plate;

forming a bowl-shaped photo-emissive recess at each of the altered individual areas; and spacing the substrate from the microchannel plate by a distance which results in each bowl-shaped photo-emissive recess being proximity focussed on the input aperture of the same channel that defined the individual area at which the bowl-shaped photoemissive recess was formed.

2. The method of claim 1 wherein the ion radiation alters the surface of the substrate by scattering and physically forms bowl-shaped recesses in a pattern corresponding to the channels of the microchannel plate, the bowl-shaped recesses then being suitably treated to form bowl-shaped photo-emissive recesses.

* * * * *